Patented July 19, 1949

2,476,859

UNITED STATES PATENT OFFICE 2,476,859

PROCESS FOR PREPARING ACID ANHYDRIDES AND ACETONE

Hugh J. Hagemeyer, Jr., Kingsport, Tenn., assignor to Eastman Kodak Company, Rochester, N. Y., a corporation of New Jersey No Drawing. Application February 7, 1948, Serial No. 6,987

15 Claims. (Cl. 260—342.6)

This invention relates to the preparation of organic acid anhydrides. More specifically, this invention relates to the preparation of organic carboxylic acid anhydrides with the formation of acetone as a by-product.

Various means have been proposed for the preparation of the anhydrides of organic carboxylic acids. While some of these methods are satisfactory for the preparation of certain types of anhydrides, they are of little value in the preparation of other, different anhydrides. One of the methods known to the art comprises reacting ketene with an organic carboxylic acid to produce a mixed anhydride of the organic acid and acetic acid. Upon distillation this mixed anhydride disproportionates according to the equation:

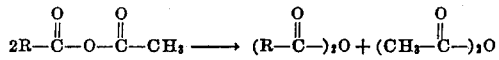

wherein R represents an organic radical other than a methyl group.

I have now found that organic carboxylic acid anhydrides, with the attendant formation of acetone, can be prepared by reacting diketene with the organic carboxylic acid whose anhydride is desired.

It is, therefore, an object of my invention to provide an improved process for preparing anhydrides of organic carboxylic acids. A further object of my invention is to provide a process whereby the anhydrides of organic carboxylic acids can be prepared at low temperatures. A still further object of my invention is to provide a source for acetone, incidental to the production of organic carboxylic acid anhydrides. Other objects will become apparent from a consideration of the following description.

The process of my invention can be readily adapted for the preparation of numerous organic carboxylic acid anhydrides and is considerably more flexible than most of the methods heretofore used. Among the acids which are useful in the process of my invention are the acyclic and carbocyclic, mono- and dicarboxylic acids. Typical acids include those represented by the formula:

$$R_1-COOH$$

wherein $R_1$ represents a member selected from the group consisting of primary and secondary alkyl groups having from 1 to 4 carbon atoms, e. g., methyl, ethyl, n-propyl, isopropyl, n-butyl, isobutyl, secondary butyl, etc.; those represented by the formula:

$$HOOC-R_2-COOH$$

wherein $R_2$ represents an alkylene radical having from 2 to 3 carbon atoms in the chain; aromatic mono- and dicarboxylic acids; unsaturated mono- and dicarboxylic acids; halogenated mono- and dicarboxylic acids; keto carboxylic acids; etc. Exemplary of such acids are acetic acid, propionic acid, n-butyric acid, isobutyric acid, n-valeric acid, isovaleric acid, α-methylvaleric acid, acrylic acid, α-methylacrylic acid, crotonic acid, α-ethylacrylic acid, pyruvic acid, acetoacetic acid, levulinic acid, chloroacetic acid, bromoacetic acid, α-chloropropionic acid, β-chloropropionic acid, α-bromopropionic acid, β-bromopropionic acid, α-chloroacrylic acid, β-chloroacrylic acid, succinic acid, α-methylsuccinic acid, α,α-dimethylsuccinic acid, glutaric acid, α-methylglutaric acid, α,α-dimethylglutaric acid, α,β-dimethylglutaric acid, α-chlorosuccinic acid, phthalic acid, maleic acid, chloromaleic acid, dichloromaleic acid, benzoic acid, p-methylbenzoic acid (p-toluic acid), o-, m-, and p-chlorobenzoic acid, m-, and p- nitrobenzoic acid, phenylacetic acid, p-tolylactic acid, etc.

When diketene reacts with one or more of the organic carboxylic acids listed above in accordance with the process of my invention, a mixed anhydride of acetoacetic acid is formed according to the equation:

This mixed anhydride then reacts with another molecule of the organic carboxylic acid according to the equation:

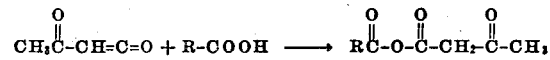
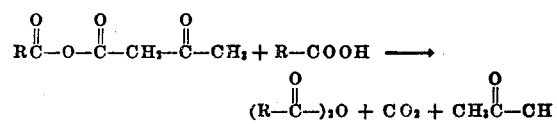

wherein R has the definition set forth above. Although the above equations would seem to indicate that the process of my invention only proceeds when at least 2 molecular equivalents of the organic carboxylic acid are present to each molecular equivalent of the diketene, in actual practice it has been found that large amounts of the anhydride of the organic carboxylic acid are formed even when equal, molecularly equivalent amounts of diketene and organic carboxylic acid are used, though a portion of the diketene does polymerize to give dehydroacetic acid or 2-hydroxy-3-acetyl-6-methyl-γ-pyrone. Advantageously, I employ from 1 to 6 molecular equivalents of organic carboxylic acid to one molecular equivalent of diketene.

The constitution of diketene has not been definitely determined, however, present evidence indicates that the structure of diketene can be considered as having either the formula:

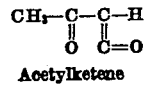

Acetylketene or

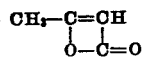

the latter representing a resonance isomer of the former (acetylketene) formula. As a matter of convenience, the diketene used in the process of my invention has been considered as having the formula represented by acetylketene given above.

The temperature used in practicing the process of my invention can be varied widely and is a function of the reactants employed. A significant advantage in the process of my invention is that it permits the use of temperatures lower than those which have heretofore been used in the preparation of anhydrides of organic carboxylic acids. The temperature used can be as low as 10° C. or as high as the refluxing temperature of the reactants employed. Usually it is convenient to use a temperature of from 10 to 100° C.

The process of my invention can advantageously be carried out in the presence or absence of a catalyst. When it is desirous to use a catalyst, an acidic condensation or esterification catalyst can be employed. Such catalysts include, for example, sulfuric acid, phosphoric acid, p-toluene sulfonic acid, N-acetyl sulfamic acid, methane disulfonic acid, ethane disulfonic acid, zinc chloride, boron trifluoride, and the like. Since the reaction between diketene and an organic carboxylic acid becomes strongly exothermic when an acidic condensation catalyst is used, to control the temperature and speed of reaction it is advantageous to add the diketene gradually to a solution of the organic carboxylic acid containing the catalyst. The solution can then be warmed to a temperature of 40-60° C., and once the reaction has been initiated, cooling or a slow rate of addition of the diketene to the reaction mixture is necessary to maintain the temperature within this range.

If desired, an inert organic solvent can advantageously be employed in practicing the process of my invention. This solvent is conveniently a solvent both for the diketene and the organic carboxylic acid. Typical solvents include 1,4-dioxane, diethyl ether, diisopropyl ether, methyl butyl ether, benzene, toluene, xylene, etc. The organic carboxylic acids themselves are excellent solvents in which the process of my invention can be carried out, although neutral solvents are especially advantageous since they slow down the rate of polymerization of the diketene. Neutral solvents are likewise desirable when an acidic condensation catalyst is employed, since it is known that the polymerization of diketene is accelerated in acid medium, and the use of a solvent materially slows down this effect.

The acetone which is formed as a by-product in the process of my invention can be left in the reaction mixture until the reaction is substantially complete and then removed by distillation, or it can be removed from the reaction vessel as fast as it is formed, when the process is carried out in an ordinary fractionation set-up. For some purposes, it may be desired to use the mixture of acetone and the anhydride of the organic carboxylic acid as formed, in which case the acetone need not be separated (as, for example, in esterifications, acylations, etc.).

The following examples will serve to illustrate further the manner of practicing the process of my invention.

*Example I.—Acetic anhydride*

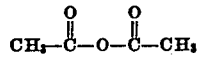

42 grams (0.5 mol.) of diketene were added to 60 grams (1 mol.) of acetic acid, and the mixture was allowed to stand at room temperature (20–25° C.) for approximately 24 hours. The mixture was then distilled at atmospheric pressure through a short, packed column. The first fraction coming over consisted of acetone boiling at 56 to 57° C., while the latter fraction consisted of acetic anhydride boiling at 139 to 140° C. The conversion of diketene and acetic acid to acetone and acetic anhydride was quantitative.

When a molecularly equivalent amount of n-valeric acid is substituted in the above example, n-valeric anhydride and acetone are obtained in excellent yields.

*Example II.—Acetic anhydride*

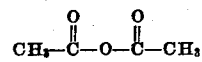

This example illustrates the formation of the anhydride of an organic carboxylic acid when equimolar amounts of diketene and carboxylic acid are reacted together.

30 grams (0.5 mol.) of acetic acid containing 3 drops of sulfuric acid were cooled to 10° C. Diketene was then added gradually until a total of 42 grams (0.5 mol.) had been added, and the mixture allowed to stand at room temperature for several hours. Upon distillation of the reaction mixture in a short, packed column at atmospheric pressure, only acetone, acetic anhydride, and a small residue of dehydroacetic acid (formed by polymerization of diketene) were obtained.

*Example III.—n-Butyric anhydride*

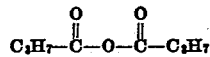

A mixture of 88 grams (1 mol) of n-butyric acid and 42 grams (0.5 mol) of diketene were refluxed for 45 minutes. The reaction mixture was then fractionally distilled in a short packed column to give 75.3 grams of n-butyric anhydride boiling at 133 to 134° C./100 mm., and 22 grams of acetone.

*Example IV.—Chloroacetic anhydride*

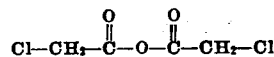

A mixture of 100 grams (1+ moles) of chloroacetic acid and 45 grams (0.5+ mol) of diketene was heated at 70 to 80° C. for several hours. Upon distillation of the reaction mixture in a short, packed column, 21 grams of acetone and 81 grams of chloroacetic anhydride boiling at 108 to 109° C./10 mm. were obtained. On standing the chloroacetic anhydride set to crystals melting at 44 to 46° C.

When a molecularly equivalent amount of α-chloroacrylic acid replaces the chloroacetic acid in the above example, α-chloroacrylic anhydride and acetone are formed in excellent yields.

Example V.—Acrylic anhydride

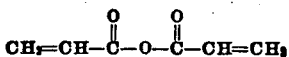

A mixture of 144 grams (2 moles) of acrylic acid, 1 gram of copper acetate (polymerization inhibitor), and 84 grams (1 mol) of diketene was prepared, and the mixture allowed to stand at room temperature for 8 hours. The reaction mixture was then fractionally distilled under reduced pressure, and after removal of the acetone, 82 grams of acrylic anhydride boiling at 97° C./35 mm. were obtained.

When a molecularly equivalent amount of α-methylacrylic acid replaces the acrylic acid in the above example, α-methylacrylic anhydride and acetone can be obtained in good yields.

Example VI.—Crotonic anhydride

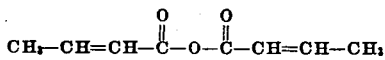

A solution of 172 grams (2 moles) of crotonic acid in 200 cc. of 1,4-dioxane was prepared. Diketene was then added gradually until a total of 84 grams (1 mol) had been added, and the solution was heated at 70 to 80° C. for several hours. Upon distillation of the reaction mixture at atmospheric pressure, 42 grams of acetone were obtained. Distillation of the residue under diminished pressure gave 124 grams of crotonic anhydride boiling at 131° C./20 mm.

Example VII.—Pyruvic anhydride

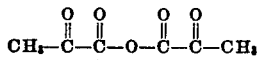

A solution of 88 grams (1 mol) of pyruvic acid in 100 cc. of diethyl ether was prepared. Diketene was then added gradually to the solution until a total of 42 grams (0.5 mol) had been added. The mixture was then allowed to stand at room temperature for 24 hours. The reaction mixture was then distilled at atmospheric pressure to remove the diethyl ether and 26.6 grams of acetone. Upon titration of the residue a neutral equivalent of 79.6 was obtained, while the calculated value for pyruvic anhydride is 79.

When a molecularly equivalent amount of levulinic acid replaces the pyruvic acid in the above example, levulinic anhydride and acetone are formed in excellent yield.

Example VIII.—Benzoic anhydride

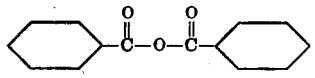

122 grams (1 mol) of benzoic acid were dissolved in 300 grams of diethyl ether containing 0.5 gram of sulfuric acid. While the temperature of the reaction mixture was maintained at a temperature of 10° C. by cooling, 42 grams (0.5 mol) of diketene were added gradually. After standing at room temperature for several hours, the reaction mixture was distilled to give 26.4 grams of acetone and a residue, which upon recrystallization from diethyl ether gave 97 grams of benzoic anhydride melting at 41 to 42° C.

When a molecularly equivalent amount of p-chlorobenzoic acid replaces the benzoic acid in the above example, p-chlorobenzoic anhydride and acetone are obtained in excellent yield. Operating in a similar manner, a molecularly equivalent amount of phenylacetic acid gives an excellent yield of phenylacetic anhydride and acetone.

Example IX.—Succinic anhydride

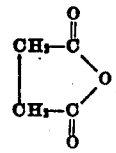

A solution of 118 grams (1 mol) of succinic acid and 0.5 gram of sulfuric acid in 300 grams of 1,4-dioxane was prepared. While the temperature of the solution was maintained at 10° C. by cooling, diketene was gradually added until a total of 84 grams (1 mol) had been added. After the reaction mixture had been allowed to stand at room temperature for several hours, it was distilled to give 51.2 grams of acetone. The residue was sublimed under a reduced pressure of 50 mm. to give 71 grams of succinic anhydride melting at 118 to 119° C.

When a molecularly equivalent amount of phthalic acid replaces the succinic acid in the above example, an excellent yield of phthalic anhydride and acetone can be obtained. Similarly when a molecularly equivalent amount of maleic acid replaces the succinic acid used above, maleic anhydride and acetone can be obtained.

Example X.—Acrylic anhydride

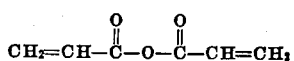

42 grams (0.5 mol) of diketene were added to 72 grams (1 mol) of acrylic acid containing 0.25 gram of copper acetate. The mixture was then allowed to stand at room temperature for 8 hours, and was then distilled at atmospheric pressure to give 25.7 grams of acetone. The residue was distilled at reduced pressure to give 42 grams of acrylic anhydride boiling at 74 to 76° C./10 mm.

Operating in a similar manner and by substituting still other organic carboxylic acids in the above examples, other organic carboxylic acid anhydrides can be prepared.

The anhydrides prepared in accordance with the process of my invention are useful in the preparation of esters, amides, nitriles, synthetic resins, etc.

I claim:

1. A process for preparing an organic carboxylic acid anhydride and acetone which comprises reacting at a temperature of from 10° to 100° C. diketene with an organic carboxylic acid selected from the group consisting of aliphatic and carbocyclic, monocarboxylic and dicarboxylic acids.

2. A process for preparing an organic carboxylic acid anhydride and acetone which comprises reacting at a temperature of from 10° to 100° C. diketene with an organic carboxylic acid selected from the group consisting of aliphatic and carbocyclic monocarboxylic and dicarboxylic acids in the presence of an acidic condensation catalyst.

3. A process for preparing an aliphatic acid anhydride and acetone which comprises reacting at a temperature of from 10° to 100° C. an aliphatic carboxylic acid with diketene.

4. A process for preparing an aliphatic monocarboxylic acid anhydride and acetone which comprises reacting at a temperature of from 10° to 100° C. diketene with an aliphatic monocarboxylic acid.

5. A process for preparing an aliphatic dicarboxylic acid anhydride and acetone which comprises reacting at a temperature of from 10° to 100° C. diketene with an aliphatic dicarboxylic acid.

6. A process for preparing an aromatic monocarboxylic acid anhydride and acetone which comprises reacting at a temperature of from 10° to 100° C. diketene with an aromatic monocarboxylic acid.

7. A process for preparing an aliphatic monocarboxylic acid anhydride and acetone which comprises reacting at a temperature of from 10° to 100° C. diketene with an aliphatic monocarboxylic acid represented by the formula:

R—COOH wherein R represent a primary alkyl group having from 1 to 4 carbon atoms.

8. A process for preparing an aliphatic monocarboxylic acid anhydride and acetone which comprises reacting at a temperature of from 10° to 100° C. diketene with an aliphatic monocarboxylic acid represented by the formula:

R—COOH wherein R represents a primary alkyl group having from 1 to 4 carbon atoms in the presence of an acidic condensation catalyst.

9. A process for preparing an organic carboxylic acid anhydride and acetone which comprises reacting at a temperature of from 10° ot 100° C. diketene with an aliphatic dicarboxylic acid represented by the formula:

HOOC—R₁—COOH wherein R₁ represents an alkylene group having from 2 to 3 carbon atoms in the chain.

10. A process for preparing acetic anhydride and acetone which comprises reacting at a temperature of from 10° to 100° C. diketene with acetic acid.

11. A process for preparing acetic anhydride and acetone which comprises reacting at a temperature of from 10° to 100° C. one molecular equivalent of diketene with from 1 to 6 molecular equivalents of acetic acid.

12. A process for preparing benzoic acid anhydride and acetone which comprises reacting at a temperature of from 10° to 100° C. diketene with benzoic acid.

13. A process for preparing succinic anhydride and acetone which comprises reacting at a temperature of from 10° to 100° C. diketene with succinic acid.

14. A process for preparing an organic carboxylic acid anhydride and acetone which comprises reacting at a temperature of from 10° to 100° C. one molecular equivalent of diketene with from 1 to 6 molecular equivalents of an organic carboxylic acid selected from the group consisting of aliphatic and carbocyclic, monocarboxylic and dicarboxylic acids.

15. A process for preparing an organic carboxylic acid anhydride and acetone which comprises reacting at a temperature of from 10° to 100° C. one molecular equivalent of diketene with from 1 to 6 molecular equivalents of an organic carboxylic acid selected from the group consisting of aliphatic and carbocyclic, monocarboxylic and dicarboxylic acids in the presence of an inert organic solvent.

HUGH J. HAGEMEYER, Jr.

REFERENCES CITED

The following references are of record in the file of this patent:

UNITED STATES PATENTS

| Number | Name | Date |
|---|---|---|
| 2,019,983 | Law | Nov. 5, 1935 |
| 2,235,561 | Nadeau et al. | Mar. 18, 1941 |